(12) United States Patent
Sutton et al.

(10) Patent No.: US 9,505,489 B2
(45) Date of Patent: Nov. 29, 2016

(54) FLEXING CLEVIS ARRANGEMENT BOLTED JOINT ATTACHMENT FOR FLEXIBLE ROTOR HUB WITH HIGH OFFSET AND HIGH FLAPPING

(71) Applicant: Bell Helicopter Textron Inc., Fort Worth, TX (US)

(72) Inventors: Drew Sutton, Watauga, TX (US); Frank B. Stamps, Colleyville, TX (US); Patrick Ryan Tisdale, Keller, TX (US); Paul Oldroyd, Azle, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 581 days.

(21) Appl. No.: 13/801,965

(22) Filed: Mar. 13, 2013

(65) Prior Publication Data

US 2014/0271200 A1 Sep. 18, 2014

(51) Int. Cl.
*B64C 27/33* (2006.01)
*B64C 27/48* (2006.01)
*B64C 11/02* (2006.01)
*B64C 27/32* (2006.01)

(52) U.S. Cl.
CPC ............ *B64C 27/33* (2013.01); *B64C 11/02* (2013.01); *B64C 27/32* (2013.01); *B64C 27/48* (2013.01); *Y10T 29/49316* (2015.01)

(58) Field of Classification Search
CPC ....... B32B 37/02; B64C 27/33; B64C 27/35; B64C 27/39; B64C 27/41; B64C 27/32; B64C 27/327; B64C 27/37; B64C 27/48; B64C 2027/4736; B64C 70/207; B64C 11/04; B64C 11/06; B64C 11/12; Y10T 29/49316

USPC ......... 416/230, 244 R, 134 A, 140, 141, 135
See application file for complete search history.

(56) References Cited

U.S. PATENT DOCUMENTS

| 3,874,815 | A | 4/1975 | Baskin |
| 4,008,980 | A | 2/1977 | Noehren |
| 4,047,839 | A | 9/1977 | Ferris et al. |
| 4,227,857 | A | 10/1980 | Reyes |

(Continued)

FOREIGN PATENT DOCUMENTS

| EP | 0022918 | 1/1981 |
| EP | 0097885 | 1/1984 |
| EP | 0323857 | 7/1989 |
| GB | 2001025 | 1/1979 |
| GB | 2033861 | 5/1980 |
| WO | 2007/106064 | 9/2007 |

OTHER PUBLICATIONS

Foreign Communication From a Counterpart Application, European Application No. 13168626.3, Extended European Search Report dated Nov. 11, 2013, 9 pages.

(Continued)

*Primary Examiner* — Thomas Denion
*Assistant Examiner* — Xiaoting Hu

(57) ABSTRACT

A flexible joint assembly for providing flexure to a rotor blade comprising an upper hub plate and a lower hub plate configured to secure a rotor blade yoke via a bolted joint located radially outward of a mast; and an upper flexure assembly connected to the upper hub plate and a lower flexure assembly connected to the lower hub plate, wherein the upper flexure assembly and lower flexure assembly are configured to promote flapping of the rotor blade yoke about a flapping hinge located radially outward of the bolted joint.

16 Claims, 7 Drawing Sheets

(56) References Cited

U.S. PATENT DOCUMENTS

| | | | |
|---|---|---|---|
| 4,293,276 A | 10/1981 | Brogdon | |
| 4,349,316 A | 9/1982 | Hughes et al. | |
| 4,349,317 A * | 9/1982 | Desjardins | B64C 27/33 416/134 A |
| 4,369,018 A | 1/1983 | Brunsch | |
| 4,427,340 A | 1/1984 | Metzger | |
| 4,430,045 A | 2/1984 | Cresap | |
| 4,626,172 A | 12/1986 | Mouille et al. | |
| 4,650,401 A * | 3/1987 | Yao | B64C 27/33 416/134 A |
| 4,676,720 A | 6/1987 | Niwa | |
| 4,898,515 A | 2/1990 | Beno et al. | |
| 5,286,167 A * | 2/1994 | Byrnes | B64C 27/33 416/134 A |
| 5,690,474 A | 11/1997 | Byrnes et al. | |
| 6,196,800 B1 | 3/2001 | Bauer | |
| 7,665,969 B2 | 2/2010 | Stamps et al. | |
| 9,073,625 B1 | 7/2015 | Ingram, III | |
| 2006/0165527 A1* | 7/2006 | Stamps | B64C 27/48 416/134 A |
| 2011/0027083 A1 | 2/2011 | Stamps | |
| 2011/0274548 A1* | 11/2011 | Stamps | B64C 27/33 416/174 |
| 2013/0004311 A1 | 1/2013 | Stamps et al. | |
| 2013/0216384 A1 | 8/2013 | Stamp | |

OTHER PUBLICATIONS

European Search Report issued in European Application No. 13180136.7 on May 13, 2014, 5 pages.
Communication pursuant to Article 94(3) EPC issued in European Appplication No. 13180136.7 on May 23, 2014, 6 pages.
Communication Pursuant to Article 94(3) EPCT issued in European Application No. 13168626.3 on Mar. 18, 2014; 4 pages.
Maresh, Andrew, et al.; "Composite Rotor System Using Two Race Track Style Cantilevered Yokes;" Application Filed Mar. 13, 2013.
Maresh, Andrew, et al.; "High Flapping Yoke Hub Assembly Using a Cylindrical Elastomeric Attachment to Avoid Holes;" U.S. Appl. No. 13/797,334, filed Mar. 12, 2013.
Communication under Rule 71(3) EPC issued in European Application No. 13168626.3 on Sep. 15, 2014; 35 pages.
Invitation pursuant to Rule 62a(1) EPC issued in European Application No. 14152690.5 on Jun. 11, 2014, 4 pages.
Partial European Search Reportt issued in European Applcation No. 14152690.5 on Oct. 9, 2014, 7 pages.
Office Action issued in U.S. Appl. No. 13/797,334 on Nov. 5, 2015, 12 pages.
Office action issued in U.S. Appl. No. 13/801,733 on Sep. 9, 2015, 15 pages.
European Search Report issued in European Application No. 14152690.5 on Mar. 5, 2015; 6 pages.
Communication Pursuant to Article 94(3) EPC issued in European Application No. 14152690.5 on Mar. 18, 2015; 10 pages.
Communication Pursuant to Article 94(3) EPC issued in European Application No. 13180136.7 on Sep. 2, 2015; 4 pages.
Communication pursuant to Article 94(3) EPC issued in European Appplication No. 13180136.7 on Feb. 12, 2015, 4 pages.
European Search Report issued in European Application No. 15188195.0 on Apr. 22, 2016; 4 pages.
Communication Pursuant to Article 94(3) EPC issued in European Application No. 15188195.0 on May 4, 2016; 5 pages.
Communication under Rule 71(3) EPC issued in European Application No. 13180136.7 on Mar. 11, 2016; 48 pages.
Communication under Rule 71(3) EPC issued in European application No. 14152690.5 on Nov. 17, 2015; 27 pages.

* cited by examiner

FLEXING CLEVIS ARRANGEMENT BOLTED JOINT ATTACHMENT FOR FLEXIBLE ROTOR HUB WITH HIGH OFFSET AND HIGH FLAPPING

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In the field of helicopters, engineers are constantly seeking to improve the ability of a rotor blade to flap during flight. While several systems may allow a rotor blade to bend upwards 4 degrees from the flapping axis and downwards 4 degrees form the flapping axis, exceeding a +/-4 degree flapping range poses great challenges.

Previous systems have provided means for enhancing the flapping range of pass-through rotor blades that are stacked on top of one another. However, advantages may be gained by configuring the rotor hub assembly in an in-plane configuration (e.g., wherein all yokes lie in a common plane). For example, an in-plane configuration comprising yokes that terminate radially outward of the mast may be more time and cost efficient to manufacture in comparison to a stacked, pass-through configuration (e.g., using racetrack-style yoke), and an in-plane configuration may exert less load on the hub and mast compared to a pass-through configuration.

In-plane configurations may comprise a yoke that includes a lug that is secured to the hub by way of a bolted joint. Thus, when designing an in-plane rotor configuration, attention must be given to the fact that flapping of the rotor blade (and hence flapping of the associated yoke) may exert shear on the bolted joint. Therefore, needed is an in-plane rotor assembly that facilitates rotor blade flapping while reducing the amount of shear exerted on the bolted joint.

SUMMARY

In an embodiment, disclosed is a flexible joint assembly for providing flexure to a rotor blade, the flexible joint assembly comprising an upper hub plate and a lower hub plate configured to secure a rotor blade yoke via a bolted joint located radially outward of a mast; and an upper flexure assembly connected to the upper hub plate and a lower flexure assembly connected to the lower hub plate, wherein the upper flexure assembly and lower flexure assembly are configured to promote flapping of the rotor blade yoke about a flapping hinge located radially outward of the bolted joint.

In an embodiment, a method is disclosed for providing flexure to a rotor blade comprising: securing a rotor blade yoke to an upper hub plate and a lower hub plate via a bolted joint, and promoting flapping of the rotor blade yoke about a flapping hinge that is located radially outwardly from the bolted joint.

In an embodiment, a method is disclosed for manufacturing a plurality of rotor blade yokes comprising: constructing a plank made out of taped composite material, cutting a plurality of rotor blade yokes from the plank, and punching at least one aperture through each rotor blade yoke.

BRIEF DESCRIPTION OF THE DRAWINGS

For a detailed description of the disclosed embodiments, reference will now be made to the accompanying drawings in which.

DETAILED DESCRIPTION

Figure 1:
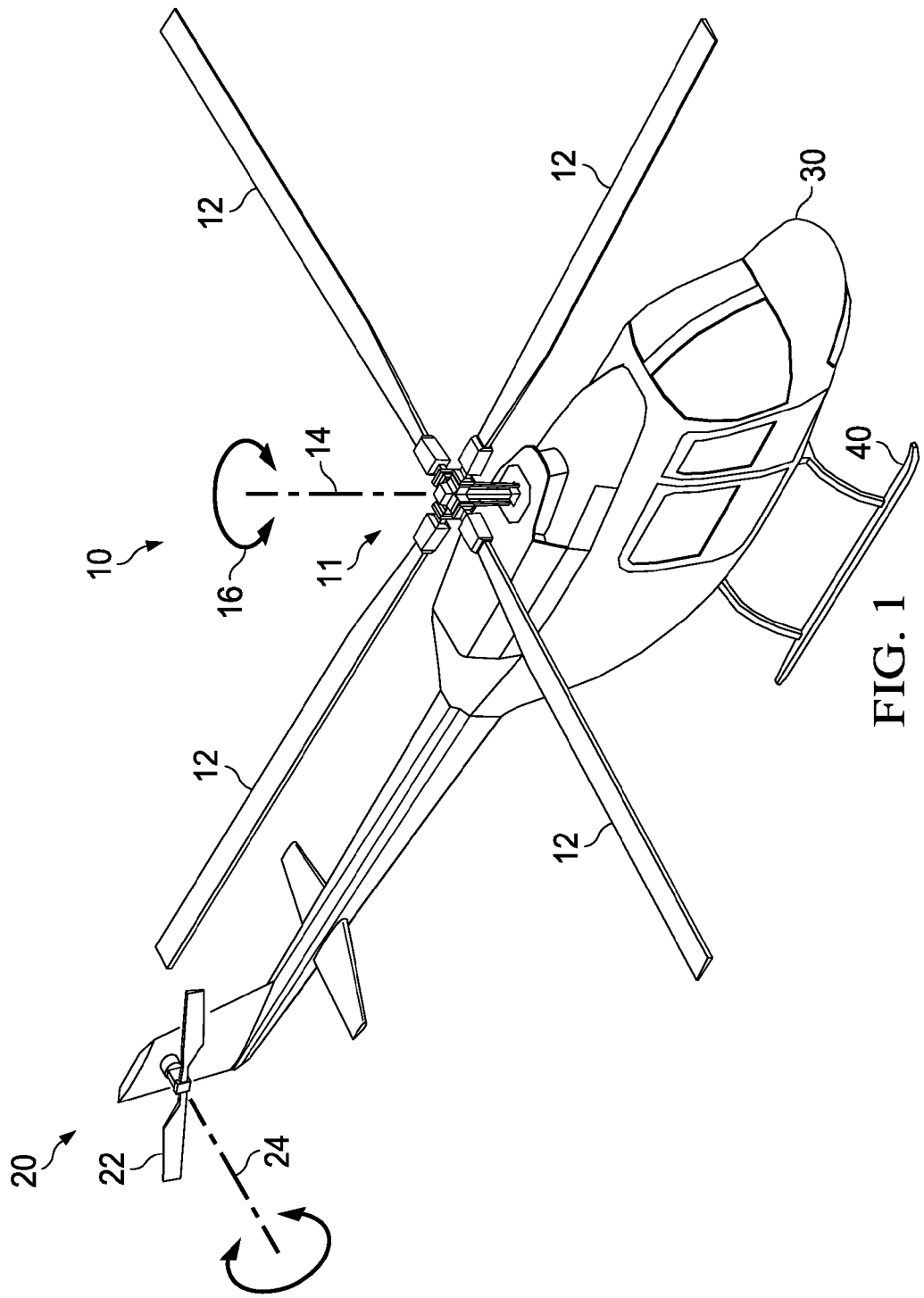
FIG. 1 is a perspective view of a helicopter according to an embodiment of the disclosure.

It should be understood at the outset that although an illustrative implementation of one or more embodiments is provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Described herein is rotor hub assembly for a helicopter. More particularly, described herein is an in-plane rotor hub assembly that provides superior rotor blade flapping capability while preserving the structural integrity of the rotor hub and yoke. The disclosed rotor-hub assembly may comprise a flexing joint assembly configured to facilitate rotor flapping while reducing resulting shear exerted on the rotor hub and yoke.

The rotor hub assembly may comprise an upper hub plate and a lower hub plate configured to secure a yoke therebetween by way of a bolted joint attachment. Located radially outwardly from the bolted joint, each rotor hub plate may comprise a surface onto which a flexure assembly may be attached. Thus, the upper hub plate may be coupled to an upper flexure assembly and the lower hub plate may be coupled to a lower flexure assembly.

The flexure assembly may comprise any type of flexure assembly currently known or not yet known in the art. For example, the flexure assembly may comprise at least one shoe, spring, or elastomeric package. In some embodiments, at least one flexure assembly comprises a curved shoe that includes an arcuate surface located opposite the surface attached to an associated rotor hub plate. The flexure assembly may comprise any non-rigid or semi-rigid material configured to react to and manage strain exerted by a yoke. The flexure assembly may be made of material that is tailored or non-tailored, and that is spring-rate linear or spring-rate non-linear. For example, the flexure assembly may comprise composite material, rubber spring material, or metal spring material.

In some embodiments, the flexure assembly may comprise shoes. For example, an upper shoe may attach to the upper hub plate and a lower shoe may attach to the lower hub plate. The upper and lower shoes may comprise suitable material (e.g., various composite materials) to facilitate bending of the yoke, thereby facilitating flapping of the rotor blade at any location, including a location coincident with the bolted joint or a location external to the bolted joint. In the preferred embodiments, the upper and lower shoes may facilitate flapping of the rotor blade at a location external to the bolted joint. The upper shoe and lower shoe may comprise a substantially planar surface for engagement with a hub plate and a substantially arcuate surface for engagement with the yoke. Thus, as the blade flaps up and down, the yoke may abut the upper shoe and lower shoe respectively. The arcuate shape may provide a desired flapping characteristic to the respective yoke and thus facilitate flapping of an associated rotor blade.

The upper and lower hub plates may each comprise an inward surface through which the bolt may extend. Located radially outward of the substantially planar surface, each hub plate may comprise a recess leading into an outward surface. The recess may comprise a "contact-free" zone in that at least one edge of the recess may not contact an insert nor a shoe. Thus, the contact-free recess may act to separate the forces experienced by inward surfaces from the forces experienced by the outward surfaces. Moreover, the flexure assembly may facilitate isolating the shear reaction of the flapping yoke to the radially outward portion of the hub plates. The inward surfaces are configured to secure the yoke via a bolted joint while the outward surfaces are configured to react to forces exerted from flapping of the yoke. Thus, because the disclosed flexing joint assembly isolates forces associated with the bolted joint from forces resulting from the flapping region, the yoke experiences improved flapping ability. Also, because the disclosed flexing joint assembly isolates vertical shear associated with flapping from the bolted joint region, the stress exerted on the bolted joint is reduced, thereby improving the structural integrity of the hub and yoke.

Thus, the flexing joint assembly provides a flapping hinge that is located distally outboard from the bolted joint. The flexing joint assembly also provides an adaptable flapping hinge that moves in accordance with the flapping of the blade. For example, as deflection increases, the point of contact between the lower shoe and the yoke moves radially outwards. The chordwise length of the hub plate may increase, decrease, or variably change in any manner as the hub plate extends radially outwards. In a preferred embodiment, the chordwise length of the hub plates decreases as the hub plate extends radially outwards. Therefore, as the point of contact moves radially outward, the maximum interlaminer sheer stress also moves radially outwardly. As a result, the flapping hinge moves radially outwardly with increasing deflection and radially inwardly with decreasing deflection. Consequently, while in previous systems the shear reactions would remain in a particular, narrow zone (where the yoke increases beam-wise thickness to accommodate for the lug and bolted joint), in the disclosed system the shear reactions are distributed throughout the length of the shoe and yoke. Hence, the disclosed flexing joint assembly decreases the amount of stress exerted on the shoe and yoke.

The flexing joint assembly also provides easy removal and insertion of flexure assembly. The shape and/or physical properties of the flexure assembly may be chosen according to a desired bending of the yoke and flapping of an associated rotor blade. Thus, in order to manage rotor flapping, a user may remove a first flexure assembly and replace it with a second flexure assembly comprising a different shape and/or physical properties than the first flexure assembly. Also, a user may remove and perform maintenance on a flexure assembly before inserting back into the hub. Moreover, the current flexing joint facilitates removal and insertion of an individual yoke without the need for dismantling the entire rotor blade assembly.

Also disclosed is a method for manufacturing yokes in a time and cost efficient manner. Prior methods for manufacturing yokes may comprise belting the yokes. In doing so, a belt is wound around each individual yoke, thereby requiring time-consuming and tedious labor expenses. However, the disclosed method for manufacturing yokes may comprise taping a composite material (e.g., a material comprising layers of composite fibers laid in plies of substantially uniform direction), thereby eliminating the need for belting. While previous belting methods may rely on the wound fibers for shear retention, the disclosed taped joints rely on larger (thicker, longer and wider) lugs of alternating direction plies to manage the strain. The taped composite structures can be stacked in large, substantially uniform cross-sectional sheets (e.g., planks), thereby enabling multiple details to be cut to profile from one plank. Therefore, the disclosed manufacturing method improves the yoke's ability to distribute shear while reducing the costs associated with producing the yoke.

FIG. 1 is a perspective view of a helicopter 10. Certain embodiments of the disclosure may be used with a helicopter such as helicopter 10. However, it should be understood that the helicopter example is given merely for illustration purposes only. Embodiments of the present disclosure are not limited to any particular setting or application, and embodiments can be used with a bearing in any setting or application.

Helicopter 10 includes a main rotor assembly 11, a tail rotor assembly 20, a fuselage 30, and landing gear 40. Main rotor assembly 11 includes two or more blades 12 that are rotated about an axis of rotation 14 in either a clockwise direction or a counterclockwise direction, when viewed from above, as indicated by arrow 16. In a preferred embodiment, the blades 12 rotate about the axis of rotation 14 in a counterclockwise direction when viewed from above. Main rotor assembly 10 generates a lift force that supports the weight of helicopter 10 and a thrust force that counteracts aerodynamic drag.

Tail rotor assembly 20 includes two or more blades 22 that are rotated about an axis of rotation 24 (which may be substantially perpendicular to the tail of the aircraft and the tangential vector of the blade as it passes over the tail boom) in either a clockwise direction or a counterclockwise direction as indicated by arrow. Tail rotor assembly 20 counters the torque effect created by main rotor assembly 10 and allows a pilot to control the direction helicopter 10 is pointed.

Fuselage 30 is the main body section of helicopter 10. Fuselage 30 optionally holds the crew, passengers, and/or cargo and houses the engine, transmission, gear boxes, drive masts, control systems, etc. that are needed to establish an operable helicopter. Landing gear 40 is attached to fuselage 30 and supports helicopter 10 on the ground and allows it to take off and land. It will be appreciated that the hub assembly described herein could be used on the main or tail rotors of a helicopter, as well as a tiltrotor, an airplane or any other aircraft or vehicle.

Figure 2:
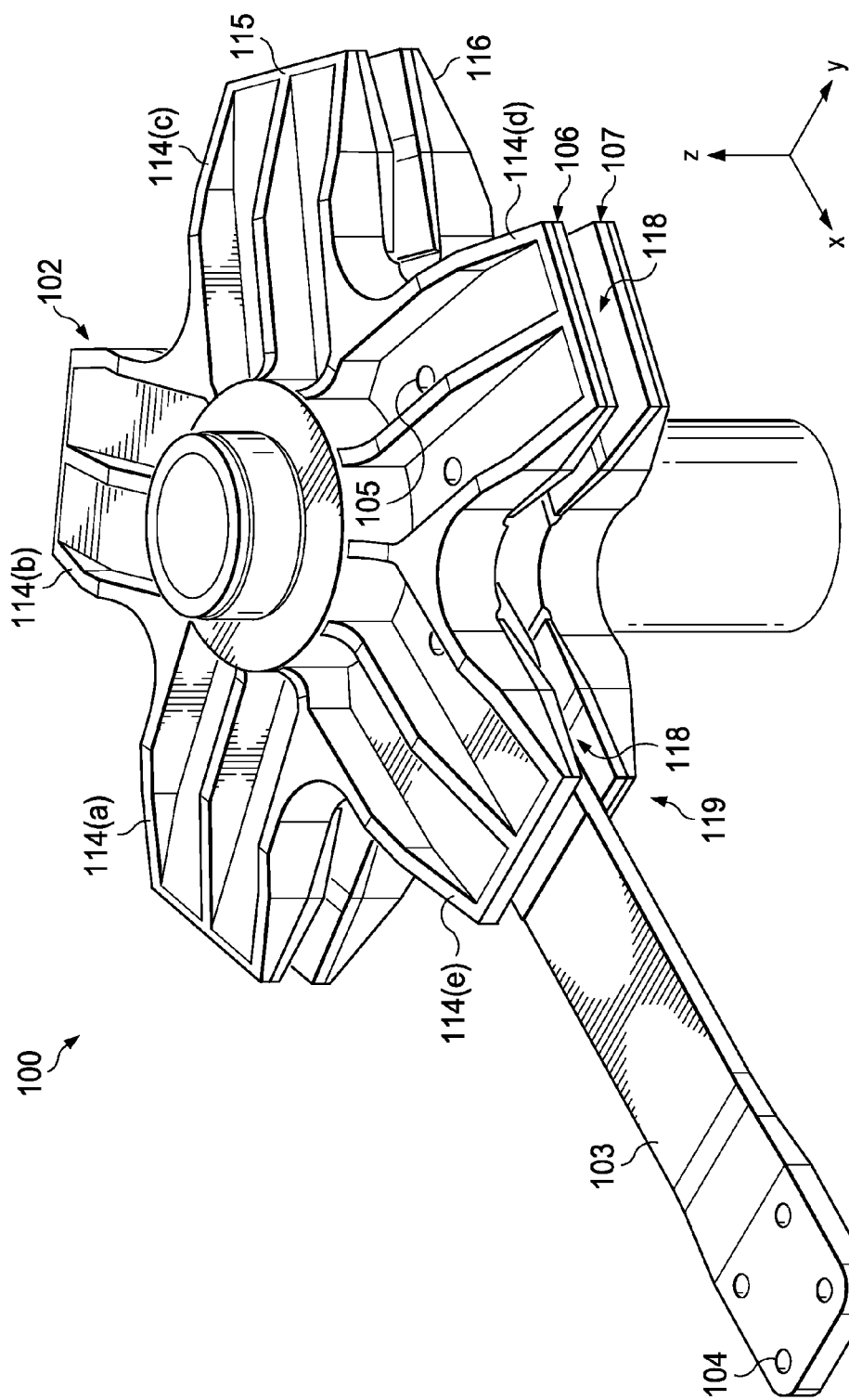
FIG. 2 is a perspective illustration of an articulated rotor hub assembly including a flexible joint assembly according to an embodiment.
Figure 3:
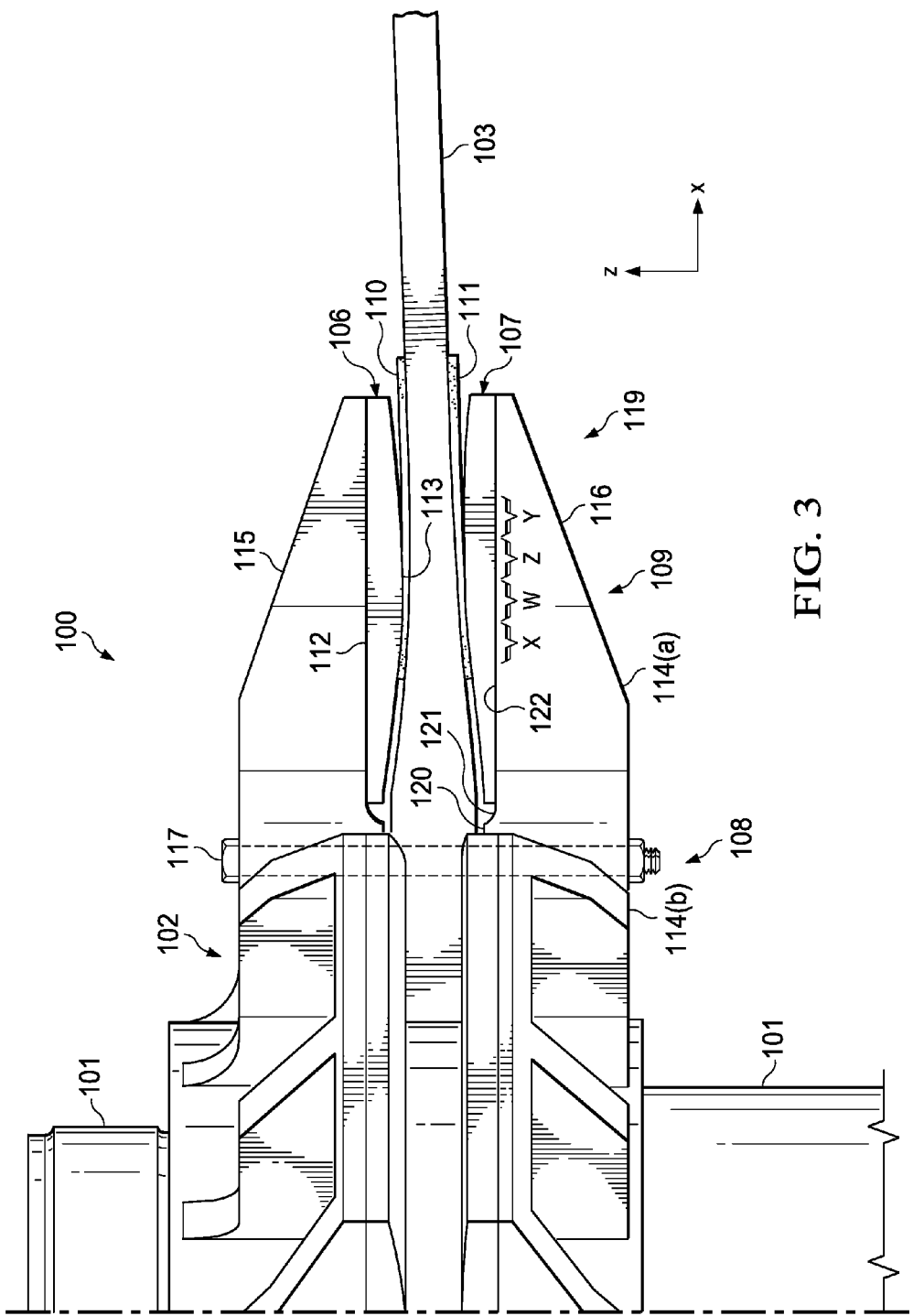
FIG. 3 is a side view of the embodiment of a flexible joint assembly as shown in FIG. 1.

Turning now to FIGS. 2 and 3, depicted is a rotor assembly 100 for a helicopter including an embodiment of a flexing joint assembly 119 in accordance with the present disclosure. The rotor assembly 100 comprises a hub 102 mounted on a mast 101 and comprising a plurality of yokes 103 extending radially outwardly from the center of the hub 102. Each yoke 103 comprises an attachment portion 104 for attachment of a rotor blade (not shown). The damper and shear bearing arrangement for each yoke 103 may be similar to the damper and shear bearing arrangement for each of the other yokes 103 in the rotor assembly 100.

In the particular embodiment depicted in FIGS. 2 and 3, the hub 102 comprises five spokes 114(a)-(e); however, those skilled in the art will appreciate that the rotor hub 102 may comprise any number of spokes 114 while remaining within the scope of the present disclosure. The rotor hub 102 may comprise an upper hub plate 115 and a lower hub plate 116. While the upper hub plate 115 and lower hub plate 116 may be formed as a single, integral unit, in the embodiment shown in FIGS. 2 and 3, the upper hub plate 115 and the lower hub plate 116 comprise separate components. The upper hub plate 115 and lower hub plate 116 may be disposed along the mast 101 to create an interior space 118 (e.g., a plane normal to the mast axis) such that a yoke 103 may be inserted within the interior space 118 and between the upper hub plate 115 and lower hub plate 116. The yoke 103 may be made from any suitable material, including various composite materials, such as carbon fiber or fiberglass. A compliant layer (e.g., rubber) may be added to a top surface and/or a bottom surface of the yoke 103 to further ensure to prevent manufacturing defects and/or FOD (foreign object Damage like rocks and other debris) from causing a damaging local peak in the contact stress of the yoke/shoe joint.

Within each spoke 114(a)-(e), the upper hub plate 115 and lower hub plate 116 may each comprise at least one aperture 105. Each yoke 103 may comprise a bolt hole 129 (shown in FIGS. 4 and 6) corresponding to the apertures 105 in the hub plates 115, 116 such that when a yoke 103 is inserted between the hub plates 115, 116, a bolt 117 (as shown in FIG. 3) may extend through all three apertures, thereby creating a bolted joint 108 (as shown in FIG. 3) that extends through the hub plates 115, 116 and yoke 103 to secure the yoke 103 within the hub 102.

While the bolt 117 effectively secures the yoke 103 within the hub 102, the bolt 117 does not facilitate desired flapping of the yoke 103 and associated rotor blade. Rather, when the yoke 103 flaps, the flapping creates stress detrimental to the structure of the hub 102 and yoke 103. Hence, in order to reduce stress exerted to the hub 102 and yoke 103 by flapping, the disclosed flexing joint assembly 119 manages the distribution of shear and helps contain the shear within a location located distally outboard from the bolted joint 108.

The flexing joint assembly 119 may comprise at least one flexure assembly. The at least one flexure assembly may comprise any type of flexure assembly currently known or not yet known in the art. In the embodiment depicted in FIGS. 2 and 3, the flexure assembly comprises an upper and a lower curved shoe 106, 107 each comprising an arcuate surface 113 (shown in FIG. 3). The upper shoe 106 may be connected to the upper hub plate 115 and the lower shoe 107 may be connected to the lower hub plate 116. The shoes 106, 107 may be integral with the yoke 103, but in the preferred embodiment the shoes 106, 107 and the yoke 103 may comprise separate components. Likewise, the shoes 106, 107 may be integral with the hub plates 115, 116, but in the preferred embodiment the shoes 106, 107 comprise separate components that attach to the hub plates 115, 116 via attachment means (e.g., bolts, etc.) (not shown). FIGS. 2 and 3 illustrate an embodiment wherein the shoes 106, 107 are not integral with the hub plates 115, 116 and are not integral with the yoke 103.

The upper shoe 106 and lower shoe 107 may comprise suitable material (e.g., various composite materials) to facilitate bending of the yoke, to thereby improve flapping of the rotor blade. The upper shoe 106 and lower shoe 107 may comprise a substantially planar surface 112 for engagement with a hub plate 115, 116 and a substantially arcuate surface 113 for engagement with the yoke 103. While the shoes 106, 107 need not comprise an arcuate surface, FIGS. 2 and 3 depict an embodiment wherein both shoes 106, 107 comprise an arcuate surface 113. The arcuate shape may provide a desired flapping characteristic to the respective yoke 103 and thus to the respective blade. Thus, the blade may flap up and down and thereby abut the upper shoe 106 and lower shoe 107. Although each of the upper shoe 106 and lower shoe 107 are illustrated as having substantially identical curvatures, it should be understood that the upper shoe 106 may have a different curvature than the lower shoe and further, that other embodiments may include only one curved shoe while the other shoe is not curved. Also, the plane of the interior space 118 may be inclined to a coning angle in order to align the yoke 103 with nominal loads experienced during flight, to thereby increase the life of the hub 102 and yoke 103.

In the embodiment illustrated in FIGS. 2 and 3, the arcuate surface 113 of the upper and lower shoes 106, 107 is elliptical. The elliptical curvature provides enhanced control of the flapping of the blades. While various curvatures are possible depending on the desired flapping characteristics of the blade, one embodiment employs an elliptical surface corresponding to a 8, 16 radial elliptical surface, for example, the minor axis being approximately 8 inches and the major axis being approximately 16 inches. However, the location of the upper and lower shoes 106, 107 and the position of their respective curvatures relative to the axis upon which the hub and mast rotate may be selected based on desirable blade flapping characteristics.

An upper compliant insert 110 (shown in FIG. 3) may be disposed between the yoke 103 and the upper shoe 106, while a lower compliant insert 111 (shown in FIG. 3) may be disposed between the yoke 103 and the lower shoe 107. In some embodiments, attachment means (e.g., an adhesive layer) (not shown) may be located between the upper insert 110 and the yoke 103 and/or between the upper insert 110 and the upper shoe 106, but in other embodiments the upper insert 110 includes other attachment means or does not include attachment means. Likewise, in some embodiments, attachment means (e.g., an adhesive layer) (not shown) may be located between the lower insert 111 and the yoke 103 and/or between the lower insert 111 and the lower shoe 107, but in other embodiments the lower insert 111 does not include attachment means. The inserts 110, 111 may cushion the yoke 103 as the yoke 103 flaps upward against the upper shoe 106 and downward against the lower shoe 107 to thereby protect the yoke 103 from structural damage. Although FIGS. 2 and 3 depict an embodiment comprising both an upper insert 110 and a lower insert 111, other embodiments may include only an upper insert 110 or only a lower insert 111. The inserts 110, 111 may be arranged within the flexible joint assembly 119 such that at least one shoe 106, 107 comprises a portion that does not contact an insert 110, 111 but is instead configured to directly abut the yoke 103.

The inserts 110, 111 may comprise a cushioning material, including elastomeric material, rubber, and polymers such as urethane. The density of the inserts 110, 111 may be selected depending on the desired durability and elastomeric quality. The upper insert 110 and lower insert 111 may be made of the same cushioning material, or the upper insert 110 may be made of a different cushioning material than the lower insert 111.

The configurations disclosed herein are beneficial in that they may provide an increased range of rotor flapping over previous levels. The yoke 103 together with the upper and lower hub plates 115, 116; upper and lower shoes 106, 107; and upper and lower inserts 110, 111 may together comprise a flapping hinge 109 (shown in FIG. 3), about which the yoke 103 flaps upward and downward. The flexing joint assembly 119 may be engineered such that the flapping hinge 109 is located distally from the bolted joint 108. Therefore, while the disclosed flexing joint assembly 119 provides improved rotor blade flapping, the flexing joint assembly 119 also protects the bolted engagement from stress incurred through movement by the yoke 103. Following is a description explaining how the flapping hinge 109 is distally located from the bolted joint 108.

Focusing now on FIG. 3, the upper hub plate 115 and the lower hub plate 116 may each comprise an inward substantially planar surface 120 through which the bolt 117 may extend. Located radially outward of the surface, each hub plate 115, 116 may comprise a recess 121 leading into an outward surface 122. The recess 121 may comprise a "contact-free" zone in that at least one edge of the recess 121 may not contact an insert 110, 111 nor a shoe 106, 107. Thus, the contact-free recess 121 may act to separate the forces experienced by inward surfaces 120 from the forces experienced by the outward surfaces 122. Moreover, the resilient inserts 110, 111 may facilitate isolating the shear reaction of the flapping yoke 103 to the radially outward portion of the hub plates 115, 116. In accord, since the inward surfaces 120 are configured to secure the yoke 103 via a bolted joint 108 while the outward surfaces 122 are configured to react to forces exerted by a flapping yoke 103, the disclosed flexing joint assembly 119 reduces the shears exerted on the bolted joint 108 due to flapping.

While the flexing joint assembly 119 enables the flapping hinge 109 to be located distally from the bolted joint 108, the flexing joint assembly 119 also provides an adaptable flapping hinge 109 that moves in accordance with the flapping of the blade. For example, as deflection increases, the point of contact between the lower insert 111 (and lower shoe 107 and the yoke 103 moves radially outwardly. Therefore, as the point of contact moves radially outwardly, the maximum interlaminer sheer stress also moves radially outwardly. As a result, the flapping hinge 109 moves radially outwardly with increasing deflection and radially inwardly with decreasing deflection. As the yoke 103 flaps downward and exerts pressure on the lower insert 111, lower shoe 107, and lower hub plate 116 at location W, a flapping hinge 109 is produced at location X. As the yoke 103 flaps further downward and exerts increased pressure on the lower insert 111, lower shoe 107, and lower hub plate 116 at location Y, the flapping hinge 109 moves to location Z.

As the flapping hinge 109 moves radially inwardly and outwardly, the load exerted on the yoke 103 moves as well. Therefore, as the load on the yoke 103 is more broadly distributed thereacross, the flexing joint assembly 119 reduces damage to the yoke 103 from flapping.

Figure 4:
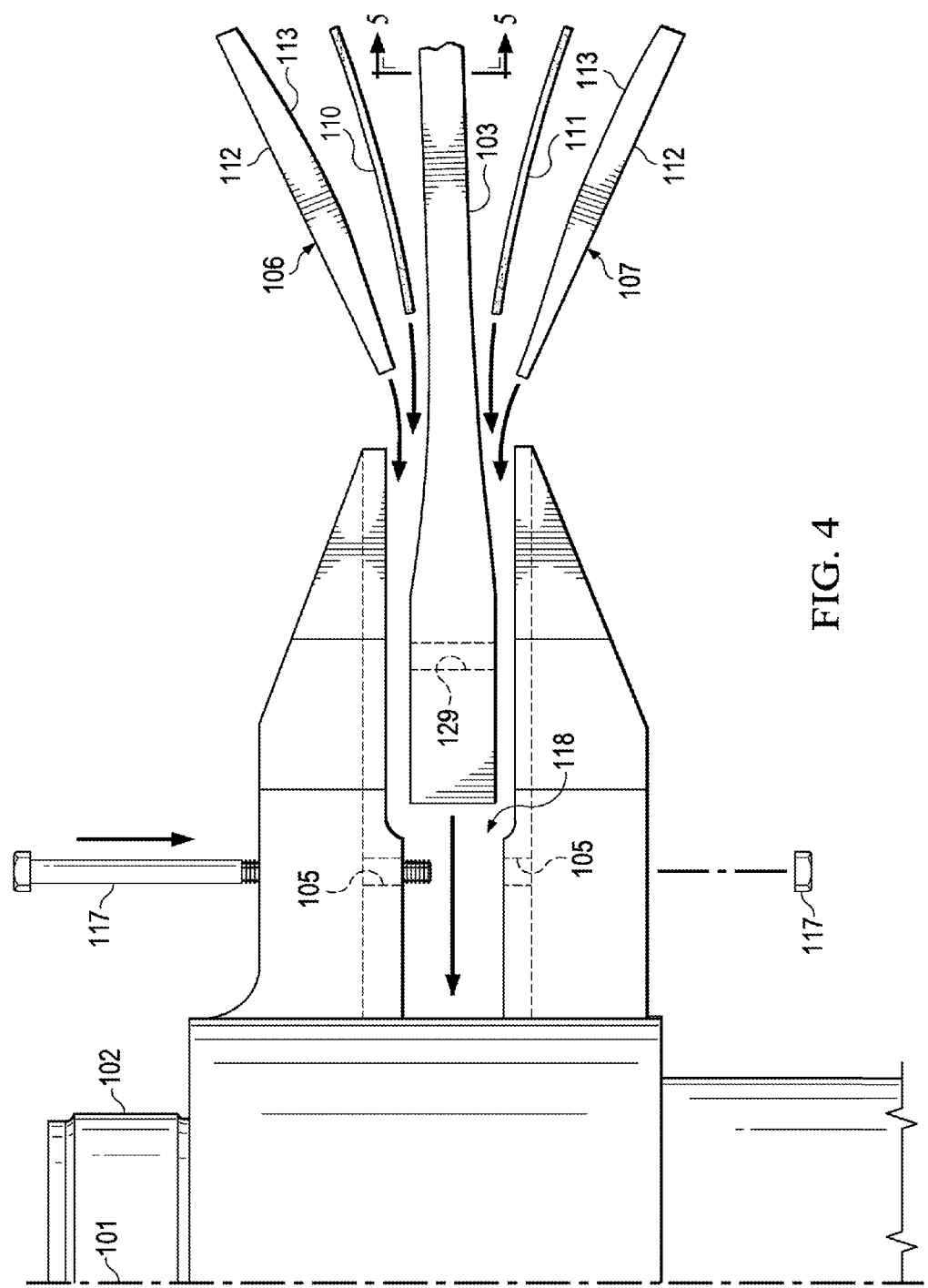
FIG. 4 is an exploded side view of a method of assembling a flexible joint assembly according to an embodiment.

FIG. 4 is an exploded diagram that illustrates an embodiment of a method of assembling the embodiment of the disclosed flexing joint assembly 119 shown in FIGS. 2 and 3. The upper and lower hub plates 115, 116 may be secured to the mast 101 such that an interior space 118 is created therebetween. Upon securement of the upper and lower hub plates 115, 116, a user may insert the yoke arm 103 into the hub 102 between the hub plates 115, 116. The height between the upper surface of the lower hub plate 116 and the lower surface of the upper hub plate 115 may be sufficiently large enough to accommodate a height of a yoke 103. In accord, while the upper and lower hub plates 115, 116 remain attached to the mast 101, a user may slide the yoke 103 into the hub assembly. The hub assembly may be configured such that the yoke 103 may slide towards the interior of the hub 102 so the at least one bolt hole 129 in the yoke 103 is aligned with the apertures 105 in the hub plates 115, 116. A user may insert at least one bolt 117 through a bolt hole 129 in the upper hub plate 115, yoke 103, and lower hub plate 116 to thereby secure the yoke 103 within the hub 102. It will be appreciated that the bolt hole 129 illustrated in FIG. 4 is the bolt hole referenced above in the description of FIG. 2. Once the yoke 103 is installed within the hub 102, the user may secure one of the upper shoe 106 and lower shoe 107 onto the corresponding hub plate 115, 116. For example, the lower shoe 107 may first be secured onto the lower hub plate 116. In embodiments where the lower shoe 107 is separate from the lower hub plate 116, the lower shoe 107 may be secured to the lower hub plate by way of attachment means (not shown). The attachment means may comprise any type of means for securing the lower shoe 107 to the lower hub plate 116, such as adhesive or an interlocking key shape to hub 102 such that the centrifugal force of the rotating hub 102 maintains the shoes 106, 107 in place. For example, a user my secure the lower shoe 107 onto the lower hub plate 116 by inserting the bolts (not shown) within the lower shoe 107. After the lower shoe 107 is attached to the hub 102, a user may slide the lower insert 111 between the lower shoe 107 and the yoke 103. Then, the user may secure the upper planar surface 112 of the upper shoe 106 onto the upper hub plate 115. In order to attach the upper shoe 106 and upper insert 110, a user may bend the yoke 103 downward. When the user bends the yoke 103 downward, the lower insert 111 and lower shoe 107 may be compressed to thereby increase the amount of space between the upper surface of the yoke 103 and lower surface of the upper hub plate 115. The upper hub plate 115 may comprise attachment means similar to the attachment means described above with reference to the lower hub plate 116. Thus, the attachment means may comprise bolts (not shown) and a user may attach the upper shoe 106 onto the upper hub plate 115 by inserting the bolts into the upper shoe 106. A user may slide the insert 110 between the yoke 103 and the upper shoe 106. In turn, the flexing joint assembly 119 provides a user with sufficient room to attach the upper shoe 106 and upper insert 110 to the upper hub plate 115 as the user bends the yoke 103, while ensuring that the yoke 103 remains tightly secured within the hub 102 upon the user releasing the yoke 103.

While in the above mentioned embodiment the user secures the lower shoe 107 and lower insert 111 prior to securing the upper shoe 106 and upper insert 110, the user may instead secure the upper shoe 106 and upper insert 110 prior to securing the lower shoe 107 and lower insert 111. In such cases, after the upper shoe 106 and upper insert 110 are secured, the user may bend the yoke 103 upwards in order to increase the amount of space between the lower surface of the yoke 103 and upper portion of the lower hub plate 116, to thereby facilitate attachment of the lower shoe 107 and lower insert 111.

The disclosed flexing joint assembly 119 allows a user to replace the shoes 106, 107 and inserts 110, 111 without the need for removing the yoke 103 from the hub 102 or disassembling the at least one bolt 117. As the above description explains how the shoes 106, 107 and inserts 110, 111 may be secured to the hub 102 after the yoke 103 is secured thereto, the shoes 106, 107 and inserts 110, 111 may also be removed from the hub 102 while the yoke 103 remains secured thereto. For example, in order to remove the upper insert 110 and upper shoe 106 from the hub 102, a user may bend the yoke 103 downward and compress the lower insert 111 and lower shoe 107 to increase the amount of space between the upper surface of the yoke 103 and the upper hub plate 115. Thus, the user may access and thereby remove the upper shoe 106 and upper insert 110 from the upper hub plate 115.

Therefore, the disclosed flexing joint assembly 119 provides a user with the ability to both remove and secure the shoes 106, 107 and inserts 110, 111 from and to the hub 102 without the need for disassembling other components of the hub rotor assembly 100. As such, the disclosed flexing joint assembly 119 facilitates maintenance, testing, and replacement of the shoes 106, 107 and inserts 110, 111.

For example, a user may remove and perform maintenance on at least one insert 110, 111 and/or shoe 106, 107 before reinserting the at least one insert 110, 111 and/or shoe 106, 107 into the hub. As another example, a user may replace the shoes 106, 107 and/or inserts 110, 111 for different shoes and/or inserts comprising alternate shapes and/or materials for various reasons such as testing and research, accommodating several desired flying styles, or accommodating changing environmental conditions. Also, a user may remove the shoes 106, 107 and inserts 110, 111 after they have been worn down or damaged and replace them with new shoes 106, 107 and inserts 110, 111.

Moreover, the disclosed flexing joint assembly 119 allows a user to replace an individual yoke arm 103 without the need for disassembling the remaining yoke arms 103 or dismantling the hub 102. For example, if a need for maintenance on a single yoke arm 103 were to arise, a user may detach the associated bolt 117 from the hub 102 and remove the shoes 106, 107 and inserts 110, 111 without having to remove the other yokes 103 in the rotor assembly 100 and without having to disassemble the hub plates 115, 116 themselves. The interior space 118 between the upper surface of the lower hub plate 116 and the lower surface of the upper hub plate 115 may be at least slightly larger than the largest height of the yoke arm 103. In the particular embodiment shown in FIGS. 1-3, the largest height of the yoke arm 103 is located at the most inward region thereof. Since the space between the upper surface of the lower hub plate 116 and the lower surface of the upper hub plate 115 is larger than the largest height of the yoke 103, the entire yoke may slide out from between the hub plates 115, 116 while the hub plates 115, 116 remain in place. In such case, in order to remove the yoke 103 from the hub, a user may simply bend the yoke 103 downward to compress the lower insert 111 and lower shoe 107 to thereby remove the upper insert 110 and upper shoe 106. Then, the user may lift the yoke 103 upward to remove the lower insert 111 and lower shoe 107.

Of course, a user need not remove the upper insert 110 and upper shoe 106 first and may instead remove the lower insert 111 and lower shoe 107 before removing the upper insert 110 and upper shoe 106. In such cases, the user may lift the yoke 103 upward to compress the upper insert 110 and upper shoe 106 to thereby remove the lower insert 111 and lower shoe 107, and thereafter remove the upper insert 110 and upper shoe 106.

The disclosed flexing joint assembly 119 facilitates removal of individual yoke arms 103 without the need for disassembling the hub 102 itself or other yoke arms. Therefore, the disclosed flexing joint assembly 119 greatly facilitates maintenance of the hub 102 and yokes 103.

Figure 5:
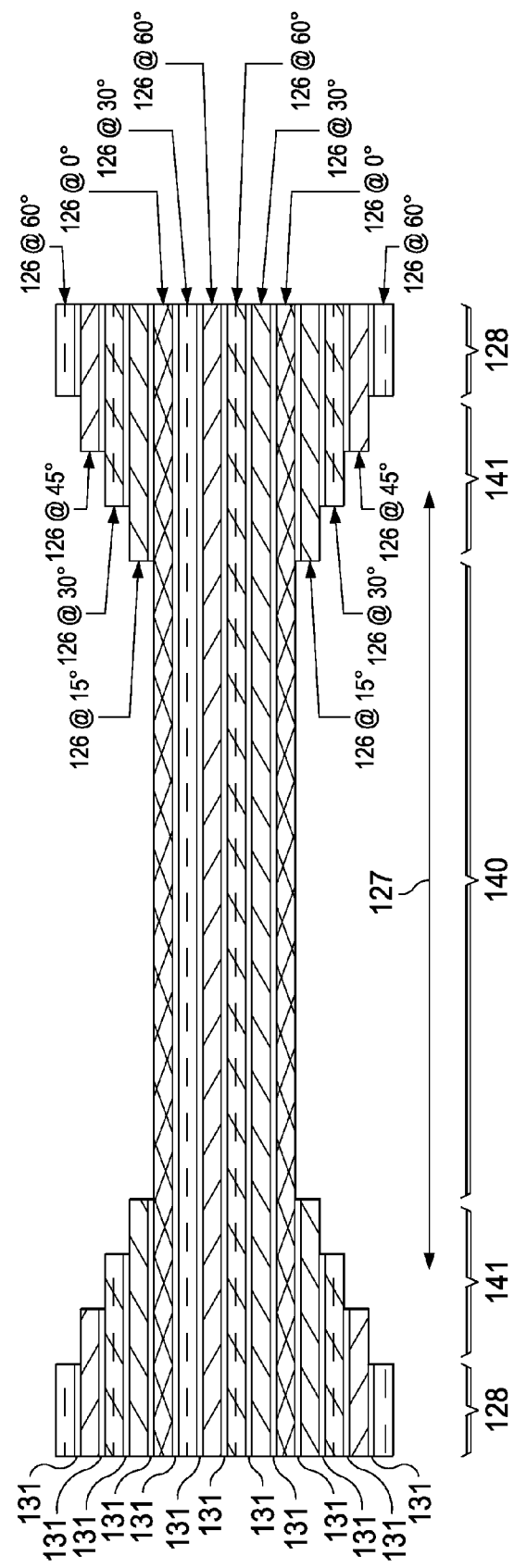
FIG. 5 is a cross-sectional view of an embodiment of a composite yoke taken along line 4-4 in FIG. 4.
Figure 6:
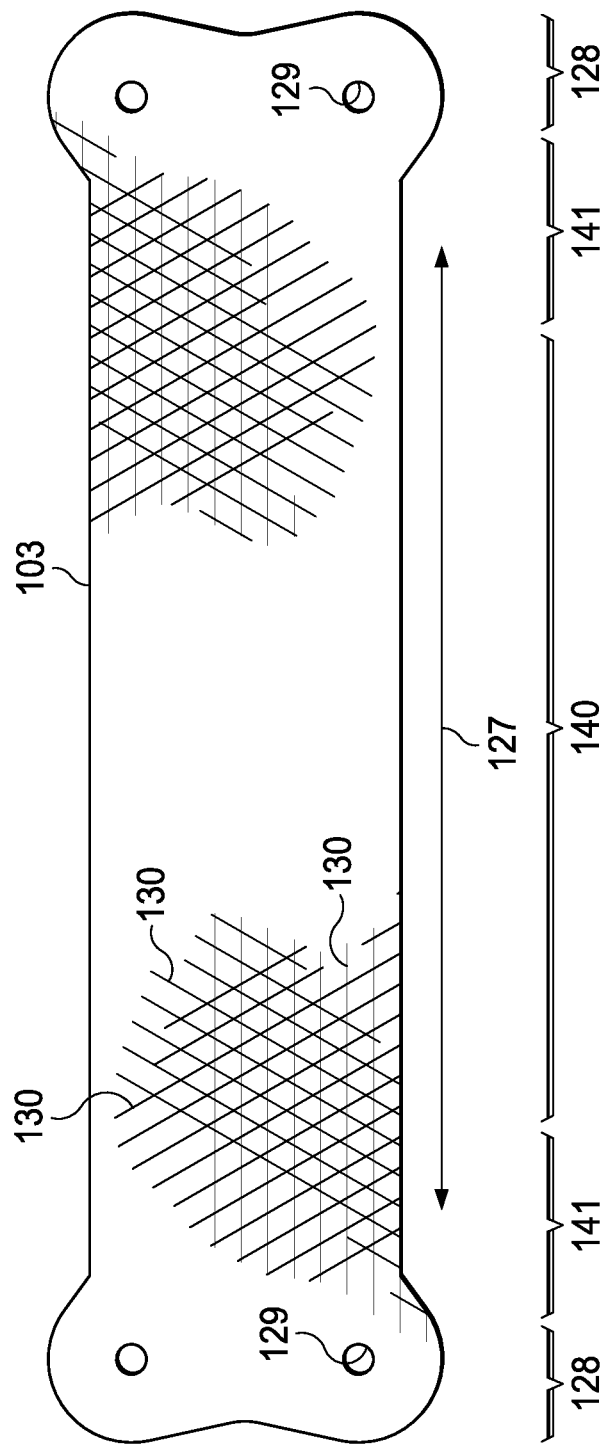
FIG. 6 is a top view of an embodiment of a composite yoke.

Turning now to FIGS. 5 and 6, the disclosed rotor assembly 100 may comprise in-plane yokes 103 that are not only radially symmetrical but are also linearly symmetrical. For example, the yokes 103 may comprise a dog-bone shape and each yoke 103 within the rotor assembly 100 may be substantially identical to the other yokes 103 within the rotor assembly 100. In some embodiments, the yokes 103 comprise a composite material such as carbon fiber or fiberglass, but they may comprise other composite materials while remaining within the scope of the current disclosure. In some embodiments, the yokes 103 comprise a taped lug. It will be appreciated that FIG. 6 illustrates the outboard bolt holes 129 that were referenced above in the description of FIG. 2.

In embodiments where the yokes 103 comprise a taped lug, the yokes 103 may be manufactured in a highly time and cost efficient manner. For example, a plank 125 may be constructed and numerous yokes 103 may be cut from the plank 125 (as shown in FIG. 5). As seen in FIG. 5, the plank 125 may comprise a chord-wise width that increases on opposite sides. The beam-wise height of the plank 125 may be substantially uniform.

The construction of the taped lug will now be described. In embodiments wherein the yokes 103 comprise composite materials, the fibers within each ply 126 of the composite material may be arranged substantially in the same orientation. The yokes 103 may comprise numerous plies 126 of composite material, and a user may control the orientation of the fibers when laying down each ply 126 of material. Thus, a user may lay a first ply 126 of composite material such that the fibers are oriented substantially along a first axis which forms a first angle relative to a longitudinal axis 127 (e.g., the first angle may equal approximately 60 degrees), the user may lay a second ply 126 of composite material such that the fibers are oriented substantially along a second axis which forms a second angle relative to the longitudinal axis 127 (e.g., the second angle may equal approximately 45 degrees), and the user may lay a third ply 126 of composite material such that the fibers are oriented substantially along a third axis which forms a third angle relative to the longitudinal axis 127 (e.g., the third angle may equal approximately 300 degrees).

The plank 125 may comprise any number of plies 126 of composite material. The fiber orientation angle associated with each ply 126 may comprise any value, and the fiber orientation angle for each ply 126 may be the same as or different from the fiber orientation angles associated with the other plies 126 within the plank 125. The various angles of the several fiber orientation angles may be arranged in a repeating pattern along the height of the plank 125.

FIG. 5 illustrates a cross-sectional view of a particular portion of an embodiment of a plank 125. FIG. 5 illustrates fourteen plies 126, wherein a first ply 126 comprises a fiber orientation angle of 60 degrees, a second ply 126 comprises a fiber orientation angle of 45 degrees, a third ply 126 comprises a fiber orientation angle of 30 degrees, a fourth ply 126 comprises a fiber orientation angle of 15 degrees, a fifth ply 126 comprises a fiber orientation angle of 30 degrees, a sixth ply 126 comprises a fiber orientation angle of 0 degrees, and so on. The FIG. 5 illustration is intended to represent only a small portion of the plank 125 height, and the plank 125 may comprise several more than the fourteen plies 126 depicted. Moreover, the fiber orientation angles described in FIG. 5 are merely exemplary. As seen in FIG. 5, the plank 125 may comprise a flexure region 140, two ramp regions 141, and two lug regions 128.

A user may construct the plank 125 by directing a machine to lay down the plurality of plies 126 at various fiber orientation angles. For example, the composite material may be fed into a machine with a fiber orientation angle of 0 degrees, and the machine may move so that the composite material possesses a particular fiber orientation angle when it is laid. The machine may move in a substantially random manner and may thus lay the plies 126 at various random fiber orientation angles, or, alternatively, a user may preselect a pattern of fiber orientation angles and the machine may move to construct the layers according to the preselected pattern. The material composition forming the produced plank 125 may be substantially homogenous throughout its height, width, and length. Hence, numerous substantially identical yokes 103 may be produced by slicing along a single plank 125. A layer of glue 131 (e.g., a resin) may be applied between the plies 126. In some embodiments, a glue 131 may be applied above each ply 126 and subsequently cured such that a layer of glue 131 separates each pair of consecutive plies 126.

FIG. 6 illustrates a yoke 103 after it has been carved out of a plank 125. The flexure region 140, two ramp regions 141, and two lug regions shown in FIG. 6 may correspond to the flexure region 140, two ramp regions 141, and two lug regions 128 shown in FIG. 5, since the yoke 103 depicted in FIG. 6 may represent a yoke 103 carved from the plank 125 depicted in FIG. 5. As depicted in FIG. 6, the yoke 103 may comprise a dog-bone shape. Lines 130 represent several fiber orientation angles associated with at least three plies 126 (as shown in FIG. 5) that make up the yoke 103. Bolt holes 129 may be punched into the yoke 103 at the appropriate locations after the yoke 103 has been sliced from the plank 126.

Therefore, the composite yoke 103 may comprise numerous plies 126 comprising various fiber orientations that intersect the bolt holes 129 at various angles. For example, within the lug 128 region, some fibers run substantially tangentially to the circumference of a bolt holes 129 while other fibers meet the circumference of the bolt holes 129 at an approximately 45 degree angle, and so on. As a result, the disclosed lug 128 is configured to react to shear applied from every direction without the inclusion of a vertically oriented belt wrapping around the yoke perimeter.

Figure 7:
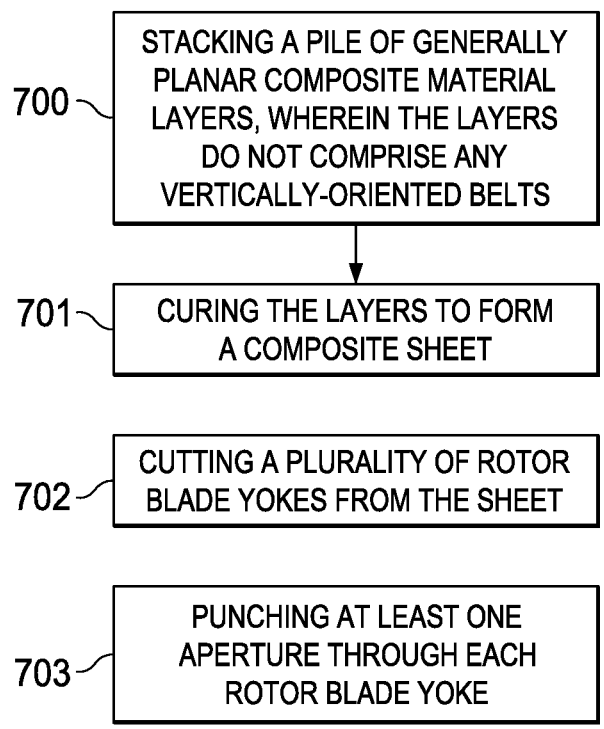
FIG. 7 is a flowchart illustrating a method of manufacturing a plurality of rotor blade yokes.

Turning next to FIG. 7, shown is a flowchart illustrating a method of manufacturing a plurality of rotor blade yokes. In step 700, the method comprises horizontally stacking a pile of generally planar layers, wherein the layers do not comprise any vertically oriented composite belts. In step 701, the method comprises curing the layers to form a composite sheet. In step 702, the method comprises cutting a plurality of rotor blade yokes from the sheet; and in step 703 the method comprises punching at least one aperture through each rotor blade yoke.

In operation, if tension is applied to the 0-degree plies, the 0-degree plies will "try to pull out" from beneath the −30-degree ply. However, as the 0-degree ply tries to pull out from beneath the −30-degree ply, the glue 131 will retain the 0-degree ply in its place by transferring the tension exerted by the 0-degree ply throughout the plies comprising other fiber orientation angles. Thus, so long as the tension exerted by the 0-degree ply remains below the shear threshold (e.g., below the yield point of the glue 131 between the 0-degree and −30-degree plies) then substantially all of the tension energy from the 0-degree ply 126 may be transferred as shear throughout the bolt hole 129 pattern without the need for a belt.

Therefore, not only does the taped lug provide superior means for transferring tension energy throughout the bolt hole patter, it also facilitates yoke manufacturing as numerous yokes may be carved from a single plank.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Unless otherwise stated, the term "about" shall mean plus or minus 10 percent. Of the subsequent value. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. A flexible joint assembly for providing flexure to a rotor blade, the flexible joint assembly comprising:
   an upper hub plate and a lower hub plate configured to secure a rotor blade yoke via a bolted joint through the rotor blade yoke and the upper and lower hub plates, the bolted joint located radially outward of a mast; and
   an upper flexure assembly connected to the upper hub plate and a lower flexure assembly connected to the lower hub plate,
   wherein the upper flexure assembly comprises an upper shoe disposed between the rotor blade yoke and the upper hub plate, and wherein the lower flexure assembly comprises a lower shoe disposed between the rotor blade yoke and the lower hub plate, wherein the upper shoe and the lower shoe are configured to abut the rotor blade yoke to promote flapping of the rotor blade yoke about a flapping hinge located radially outward of the bolted joint; and wherein at least one of the upper hub plate or the lower hub plate comprises a yoke-facing inward surface comprising a recess located longitudinally between the bolted joint and the flapping hinge relative to a longitudinal length of the rotor blade yoke, the recess defining a gap between the inward surface of the upper hub plate or lower hub plate and the upper shoe or lower shoe, wherein the recess does not contact any of the rotor blade yoke, the upper flexure assembly, and the lower flexure assembly, the recess configured to separate forces at the upper shoe and lower shoe from forces at the bolted joint and reduce shear forces acting on the bolted joint from flapping of the rotor blade yoke.

2. The flexible joint assembly of claim 1, wherein the location of the flapping hinge changes based on a pressure exerted by the rotor blade yoke on at least one of the upper shoe or the lower shoe.

3. The flexible joint assembly of claim 1, further comprising an elastomeric insert disposed at least one of: between the rotor blade yoke and the upper shoe or between the rotor blade yoke and the lower shoe.

4. The flexible joint assembly of claim 3, wherein a portion of at least one of the upper flexure assembly or the lower flexure assembly directly abuts the rotor blade yoke and does not contact the elastomeric insert.

5. The flexible joint assembly of claim 1, wherein the upper hub plate and lower hub plate form an in-plane rotor hub assembly.

6. The flexible joint assembly of claim 1, wherein an interior space is provided between the upper hub plate and the lower hub plate for insertion of the rotor blade yoke between the upper hub plate and the lower hub plate proximate the bolted joint.

7. The flexible joint assembly of claim 1, wherein the upper hub plate and the lower hub plate are connected to the mast, which is connected to an engine and a fuselage.

8. The flexible joint assembly of claim 1, wherein the upper shoe comprises an upper arcuate surface facing the rotor blade yoke, and wherein the lower shoe comprises a lower arcuate surface facing the rotor blade yoke.

9. An apparatus comprising:
a rotor blade yoke coupled to an upper hub plate and a lower hub plate via a bolted joint through the rotor blade yoke and the upper and lower hub plates,
a removable upper shoe comprising an upper arcuate surface and disposed between the rotor blade yoke and the upper hub plate, and
a removable lower shoe comprising a lower arcuate surface and disposed between the rotor blade yoke and the lower hub plate, wherein a yoke-facing inward surface of the upper hub plate comprises an upper recess located longitudinally between the bolted joint and the upper arcuate surface relative to a longitudinal length of the rotor blade yoke, the upper recess defining a first gap between the inward surface of the upper hub plate and the upper shoe, and wherein a yoke-facing inward surface of the lower hub plate comprises a lower recess located longitudinally between the bolted joint and the lower arcuate surface relative to the longitudinal length of the rotor blade yoke, the lower recess defining a second gap between the inward surface of the lower hub plate and the lower shoe, the upper recess and lower recess configured to separate forces at the upper shoe and lower shoe from forces at the bolted joint and reduce shear forces acting on the bolted joint from flapping of the rotor blade yoke.

10. The apparatus of claim 9, wherein the removable upper shoe is located radially outward of the bolted joint along the longitudinal length of the yoke, and the removable lower shoe is located radially outward of the bolted joint along the longitudinal length of the yoke.

11. The apparatus of claim 9, further comprising an elastomeric insert disposed at least one of: between the rotor blade yoke and the removable upper shoe or between the rotor blade yoke and the removable lower shoe.

12. The apparatus of claim 11, wherein a portion of at least one of the upper shoe or the lower shoe directly abuts the rotor blade yoke and does not contact the elastomeric insert.

13. The apparatus of claim 9, wherein the apparatus is an in-plane rotor hub assembly.

14. The apparatus of claim 9, wherein the upper recess does not contact any of the rotor blade yoke, the bolted joint, and the upper shoe, and wherein the lower recess does not contact any of the rotor blade yoke, the bolted joint and the lower shoe.

15. The apparatus of claim 9, wherein an interior space is provided between the upper hub plate and the lower hub plate for insertion of the rotor blade yoke between the upper hub plate and the lower hub plate proximate the bolted joint.

16. The apparatus of claim 9, further comprising an engine and a fuselage.

* * * * *